May 4, 1948.                L. M. TINT                2,440,706
                    STRAIN GAGE ASSEMBLY
            Filed Aug. 18, 1945            2 Sheets-Sheet 1
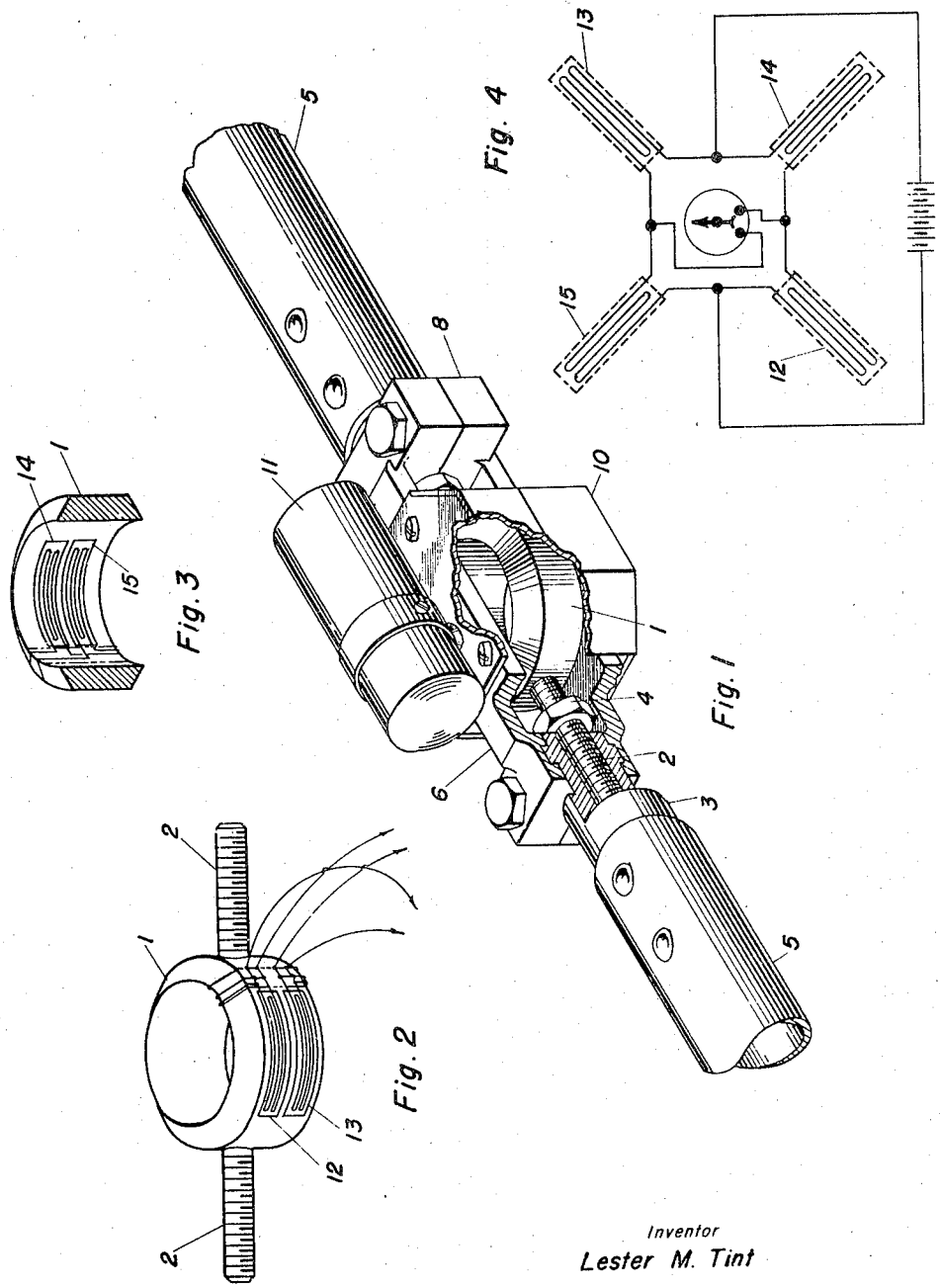
Inventor
Lester M. Tint
By Raeph L Chappell
        Attorney

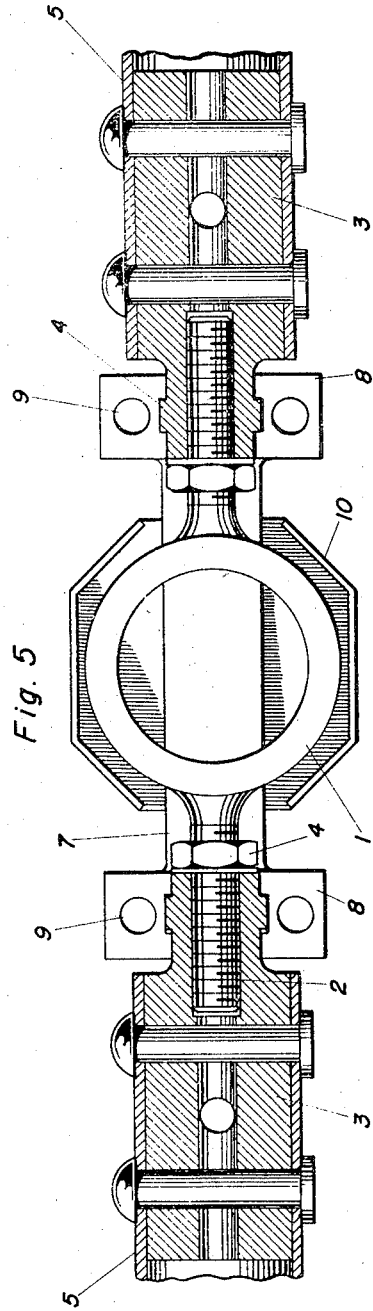
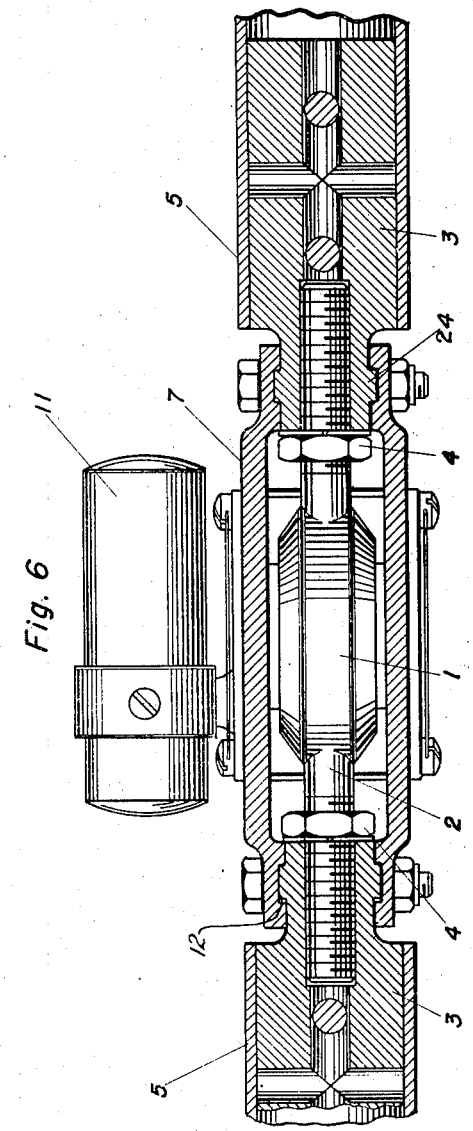

Patented May 4, 1948

2,440,706

UNITED STATES PATENT OFFICE 2,440,706

STRAIN GAGE ASSEMBLY

Lester M. Tint, Palo Alto, Calif.

Application August 18, 1945, Serial No. 611,434

8 Claims. (Cl. 73—88.5)

(Granted under the act of March 3, 1883, as amended April 30, 1928; 370 O. G. 757)

This invention is directed to a tension-compression measurement transmitter for measuring tension or compression force, whether dynamic or static, in a linear member.

Essentially, the invention is directed to a ring strain member with certain safety features. The gage can be installed in a rigid member by removing a portion of the rigid members and inserting the gage assembly in order to maintain the same overall length of the member. When tension or compression is applied to the linear member, the cheeks of the ring are deflected and support the entire load. This deflection can be measured. If the ring gage member breaks due to fatigue or if excessive load is applied, a safety bracket will function to prevent failure of the linear member.

An object of this invention is to measure tension or compression force in rigid linear members such as aircraft control rods, the tension member of glider tow fixtures, tail-chute release gear, carrier aircraft landing hooks, railroad car couplings, crane tie rods, steering rods on vehicles, tractor tow rods, or the like.

Another object is the development of a gage which may also be used to measure the tension in cable assemblies such as the control cables on aircraft, crane and elevator lifting cables, guy wires, and the like.

Other objects will become apparent from the description of the drawings, in which:

Fig. 1 is a perspective view of the device inserted in the member being tested with portions removed;

Fig. 2 is a perspective view of the ring gage member with a pair of strain gage pads applied to the outer surface;

Fig. 3 shows a pair of pads on the inner surface;

Fig. 4 is a schematic showing of the four pads arranged in a Wheatstone bridge;

Fig. 5 is a partial horizontal section of Fig. 1; and

Fig. 6 is a partial vertical section of Fig. 1.

Fig. 1 shows the ring gage assembly in which a flawless heat-treated alloy steel ring 1 serves as the strain member. Ring strain gage member 1 is of trapezoidal cross-section, as shown in Figs. 2 and 3, for a purpose later described, and is preferably provided with diametrically opposed screw threaded extensions 2. These extensions are threaded into cylindrical end fixtures 3 and locked by jam nuts 4.

Details of the end fixtures are shown in Figs. 1, 5, and 6. Each fixture is preferably cylindrical, as shown, with a reduced neck portion which is provided with peripheral shoulder or flange 24 at each end. Bolt holes are provided in the end fixtures for securing to the member 5 being tested. Between these shouldered end fixtures and bridging the strain gage is a mild steel safety frame or bracket 6. The safety frame is made up in two portions bolted together as shown in Fig. 1. Each half comprises a bridging strip 7 having flanged end portions 8. These flanged end portions are provided with bolt holes 9 for bolting the sections together and are provided with internal recesses as shown for receiving the shoulder 24 of the end fixtures. The recesses at one end of the safety frame fit tightly around the circumference and shoulder of one end fixture, and the other end of the safety frame encloses the shoulder of the other end fixture with a few thousandths inch clearance 12 on all points, as shown in Fig. 6. This clearance may be filled with lubrication grease to insure a minimum sliding friction. The recess for the shoulder on the clearance end is approximately twenty or thirty thousandths of an inch longer than the shoulder on the end fixture to allow for deflection of the ring gage member. It will be apparent that various types of end fixtures and safety brackets may be used within the scope of the invention.

When tension or compression is applied to the linear member, the cheeks of the ring are deflected and will support the entire load within the limits in which one end of the safety frame slides freely around the shoulder of the one end fixture for which clearance is provided. If the gage member breaks due to fatigue or if excessive load is applied to cause excessive distortion of the ring, the recesses on both ends of the safety bracket will engage the shoulders on the two end fixtures and prevent failure of the linear member.

The ring portion of the gage is preferably enclosed by cover member 10 of sheet steel as shown in Fig. 1. The cover is made in two matched halves secured in any suitable manner along the strain gage center line. Each of the two halves of the cover member is secured to one of the straps of the safety bracket by means of appropriate screws, and certain portions are cut out to receive the strain gage extensions as shown.

Seated and secured on the upper cover member is an amphenol cable connector 11 of the four-prong type. Any type of four-point connector can be used when bracketed to the cover. These connectors act as terminals for resistance pads secured to the ring to measure strain in a manner later described.

As previously stated, the ring is preferably trapezoidal in cross-section, as shown in Figs. 2 and 3. This is intended to equalize the stress on corresponding points on the inside and outside surfaces of the ring. On a tension-stressed ring of rectangular or circular cross-section, the stress, due to tension, combines with tensile stress of bending at a point 90 degrees from the point of force application on the section of the ring inside the neutral axis. This tensile stress subtracts from the compressive stress of bending on the ring section outside the neutral axis. Moreover, the bending stress itself on the inside surface of a curved beam is always in excess of the bending stress on the outside, due to the exponential distribution of stress. Thus, as load is applied to the ring, the stress in the inside surface of the ring may approach the allowable maximum, while the stress in the outside surface of the ring for the same load may be as low as half the maximum allowable. This, of course, would reduce the sensitivity of the circuit. These combined stresses may be equalized by moving more of the area of the section toward the inside surface, and a trapezoidal section is the simplest shape to produce this effect. It is desirable to equalize the stress in order to obtain an equalized maximum strain in all resistance grids for a given stress in the ring without exceeding the allowable stress in any critical point of the ring under the resistance pads. This will produce maximum sensitivity of the bridge circuit for any given allowable stress in the ring.

The method and means of measuring strain in the ring strain member will now be described.

Resistance pads which act as strain gages are secured to the inside and outside surfaces of the ring strain member in pairs, one above the other, and each pair is disposed opposite the other pair. These are numbered 14, 15, and 12, 13, respectively. Each of these pads or strain gages is made by cementing a grid of very fine resistance wire to thin paper by means of a suitable adhesive such as cellulose acetate cement, and the pads are in turn secured to the surfaces of the ring, as shown, with the same cement. These resistance gages are symmetrically mounted about the lateral axis of the ring, no gage being longer than 80 degrees of the ring circumference. These four resistance pads or gages are connected to form a Wheatstone bridge as shown in Fig. 4 with opposite sides of the bridge cemented on the same side of the ring gage member in order to give a maximum current output of the bridge for a given resistance change, which output is a constant function of the ring deflection. The input to the bridge circuit is a constant voltage direct current, and a recording galvanometer or recording oscillograph element is connected across the gage output. The result is a galvanometer deflection which is a direct and constant function of the force applied to the linear member being stressed, and the assembly is capable of dependably and rapidly recording changing dynamic forces. Fig. 2 shows lead wires interconnecting the resistance pads and cemented to the ring. These are preferably bound with strong thread.

The ring should be accurately aligned in a true axial manner to prevent the occurrence of excessive bending movements.

The invention described herein may be manufactured and used by or for the Government of the United States of America for governmental purposes without the payment of any royalties thereon or therefor.

What I claim is:

1. In a strain gage assembly a ring strain member provided with diametrically opposed terminal extensions, end fixtures on said terminal extensions for securing to the member being tested, a flange on each of said end fixtures, a safety bracket extending above and below the ring strain member and secured about said flanges with a slight clearance at least at one end, and strain gages mounted on said ring strain member to measure distortion in said member.

2. In a strain gage assembly a ring strain member provided with diametrically opposed terminal extensions, end fixtures on said terminal extensions for securing to the member being tested, a peripheral flange on each of said end fixtures, a safety bracket extending above and below the ring strain member and provided with recesses at each end to receive said flanges with a slight clearance at at least one end, and strain gages mounted on said ring strain member to measure distortion in said member.

3. In a strain gage assembly a ring strain member of trapezoidal cross-section with the inside face longer than and parallel to the outside face and provided with diametrically opposed terminal extensions, end fixtures on said terminal extensions for securing to the member being tested, a flange on each of said end fixtures, a safety bracket extending above and below the ring strain member and secured about said flanges with a slight clearance at least at one end, and strain gages mounted on the inner and outer surfaces of said ring strain member to measure distortion in said member.

4. In a strain gage assembly a ring strain member of trapezoidal cross-section with the inside face longer than and parallel to the outside face and provided with diametrically opposed terminal extensions, end fixtures on said terminal extensions for securing to the member being tested, a peripheral flange on each of said end fixtures, a safety bracket extending above and below the ring strain member and provided with recesses at each end to receive said flanges with a slight clearance at one end only, and strain gages mounted on the inner and outer surfaces of said ring strain member to measure distortion in said member.

5. In a strain gage assembly a ring strain member of trapezoidal cross-section with the inside face longer than and parallel to the outside face and provided with diametrically opposed terminal extensions, end fixtures on said terminal extensions for securing to the member being tested, a flange on each of said end fixtures, a safety bracket extending above and below the ring strain member and secured about said flanges with a slight clearance at one end only, and electrical resistance pads adhesively secured in pairs to the inner and outer surfaces of said ring strain member and connected in a Wheatstone bridge with opposite sides of the bridge on the same surface of the ring strain member to indicate resistance change due to distortion in said member.

6. In a strain gage assembly a ring strain member of trapezoidal cross-section with the inside face longer than and parallel to the outside face and provided with diametrically opposed terminal extensions, end fixtures on said terminal extensions for securing to the member being tested, a peripheral flange on each of said end fixtures, a safety bracket extending above and below the ring strain member and provided with recesses at each end to receive said flanges with a slight clearance at one end only, and electrical resistance pads adhesively secured in pairs to the inner and outer surfaces of said ring strain member and connected in a Wheatstone bridge with opposite sides of the bridge on the same surface of the ring strain member to indicate resistance change due to distortion in said member.

7. In a strain gage assembly a ring strain member of trapezoidal cross-section with the inside face longer than and parallel to the outside face and provided with diametrically opposed terminal extensions, end fixtures on said terminal extensions for securing to the member being tested, a flange on each of said end fixtures, a safety bracket extending above and below the ring strain member and secured about said flanges with a slight clearance at one end only, and electrical resistance gages adhesively secured in pairs to the inner and outer surfaces of the ring strain member and the gages of each pair being disposed above and below each other and connected in a Wheatstone bridge with opposite sides of the bridge on the same surface of the ring strain member to indicate resistance change due to distortion in said member.

8. In a strain gage assembly a ring strain member of trapezoidal cross-section with the inside face longer than and parallel to the outside face and provided with diametrically opposed terminal extensions, end fixtures on said terminal extensions for securing to the member being tested, a peripheral flange on each of said end fixtures, a safety bracket extending above and below the ring strain member and provided with recesses at each end to receive said flanges with a slight clearance atone end only, and electrical resistance gages adhesively secured in pairs to the inner and outer surfaces of the ring strain member and the gages of each pair being disposed above and below each other and connected in a Wheatstone bridge with opposite sides of the bridge on the same surface of the ring strain member to indicate resistance change due to distortion in said member.

LESTER M. TINT.

REFERENCES CITED

The following references are of record in the file of this patent:

UNITED STATES PATENTS

| Number | Name | Date |
| --- | --- | --- |
| 1,623,238 | Frost et al. | Apr. 5, 1927 |
| 1,650,789 | Doolittle | Nov. 29, 1927 |
| 2,243,413 | Buckingham | May 27, 1941 |
| 2,275,532 | Lamberger et al. | Mar. 10, 1942 |
| 2,316,975 | Ruge | Apr. 20, 1943 |
| 2,322,319 | Ruge | June 22, 1943 |
| 2,414,161 | Moore | Jan. 14, 1947 |